United States Patent
Hundley, Jr. et al.

(10) Patent No.: US 9,677,474 B2
(45) Date of Patent: Jun. 13, 2017

(54) SURFACE COOLER SUPPORT MECHANISM

(71) Applicant: Unison Industries, LLC, Jacksonville, FL (US)

(72) Inventors: Walter Arthur Hundley, Jr., Enon, OH (US); Derek Thomas Dreischarf, Bellbrook, OH (US); Dattu G V Jonnalagadda, Bangalore (IN); Mark Phillip Drake, Kettering, OH (US)

(73) Assignee: UNISON INDUSTRIES, LLC, Jacksonville, FL (US)

( * ) Notice: Subject to any disclaimer, the term of this patent is extended or adjusted under 35 U.S.C. 154(b) by 528 days.

(21) Appl. No.: 14/082,762

(22) Filed: Nov. 18, 2013

(65) Prior Publication Data
US 2015/0135726 A1     May 21, 2015

(51) Int. Cl.
| | | |
|---|---|---|
| *F02C 7/14* | (2006.01) | |
| *B64D 29/06* | (2006.01) | |
| *F02C 7/32* | (2006.01) | |
| *F02C 7/12* | (2006.01) | |

(52) U.S. Cl.
CPC .............. *F02C 7/32* (2013.01); *F02C 7/12* (2013.01); *F02C 7/14* (2013.01); *F05D 2260/213* (2013.01); *Y02T 50/671* (2013.01); *Y02T 50/676* (2013.01)

(58) Field of Classification Search
CPC .. F02C 7/14; F02C 7/047; B64D 29/06; F28F 1/022; F28F 3/12; F28F 7/02; F28F 1/0246; H01L 23/44
USPC .................................................... 60/266, 267
See application file for complete search history.

(56) References Cited

U.S. PATENT DOCUMENTS

| | | | |
|---|---|---|---|
| 3,756,020 A | * | 9/1973 | Moskowitz .............. F02C 7/14 415/114 |
| 5,269,135 A | | 12/1993 | Vermejan et al. |
| 5,363,654 A | * | 11/1994 | Lee ......................... F23R 3/002 165/908 |
| 7,454,894 B2 | | 11/2008 | Larkin et al. |
| 7,861,512 B2 | | 1/2011 | Olver et al. |
| 7,946,806 B2 | | 5/2011 | Murphy |
| 8,387,362 B2 | | 3/2013 | Storage et al. |
| 2006/0042225 A1 | | 3/2006 | Bruno et al. |

(Continued)

FOREIGN PATENT DOCUMENTS

| | | | |
|---|---|---|---|
| FR | 2990001 A1 | * 11/2013 | ............. F01D 25/28 |
| GB | 626571 A | * 7/1949 | ............. B64D 15/06 |

(Continued)

OTHER PUBLICATIONS

English translation for FR 2990001 A1.*
Combined Search and Examination Report issued in connection with corresponding GB Application No. GB1420382.2 dated May 15, 2015.

*Primary Examiner* — Pascal M Bui Pho
*Assistant Examiner* — Rene Ford
(74) *Attorney, Agent, or Firm* — GE Global Patent Operation; William S. Munnerlyn

(57) ABSTRACT

A surface heat exchanger is provided which utilizes forward and aft brackets to retain the heat exchanger in position. The surface heat exchanger includes a plurality of core cooling channels as well as fins which are disposed for air flow through the gas turbine engine. The brackets include a low-friction wear material as well as an isolator sheet which provides some spring force on the heat exchanger.

20 Claims, 6 Drawing Sheets

(56) References Cited

U.S. PATENT DOCUMENTS

| | | |
|---|---|---|
| 2008/0053059 A1 | 3/2008 | Olver et al. |
| 2008/0095611 A1 | 4/2008 | Storage et al. |
| 2008/0193280 A1* | 8/2008 | Addis ................ B23P 6/005 |
| | | 415/148 |
| 2008/0271433 A1 | 11/2008 | Olver |
| 2009/0097972 A1* | 4/2009 | Murphy ................ F02C 7/14 |
| | | 415/178 |
| 2009/0165995 A1* | 7/2009 | Bajusz ................ F01D 25/02 |
| | | 165/51 |
| 2010/0043396 A1 | 2/2010 | Coffinberry |
| 2011/0146051 A1* | 6/2011 | Hand ................ F02K 1/822 |
| | | 29/525.01 |
| 2011/0146944 A1* | 6/2011 | Hand ................ F02K 1/822 |
| | | 165/47 |
| 2012/0125594 A1 | 5/2012 | Elder |
| 2012/0285138 A1 | 11/2012 | Todorovic |
| 2013/0011246 A1 | 1/2013 | Todorovic |
| 2014/0044525 A1* | 2/2014 | Storage ................ F28F 3/12 |
| | | 415/144 |
| 2015/0000865 A1 | 1/2015 | Ueda |

FOREIGN PATENT DOCUMENTS

| | | | |
|---|---|---|---|
| GB | 658931 A * | 10/1951 | ............. F02C 7/047 |
| KR | 1020100138514 A | 12/2010 | |

* cited by examiner

SURFACE COOLER SUPPORT MECHANISM

STATEMENT REGARDING FEDERALLY SPONSORED RESEARCH

None.

REFERENCE TO SEQUENTIAL LISTING, ETC.

None.

CROSS-REFERENCE TO RELATED APPLICATIONS

None

BACKGROUND

The present embodiments generally pertain to heat exchangers utilized with gas turbine engines. More particularly, the present embodiments relate to, but are not limited to, mounting brackets for surface heat exchangers.

In a gas turbine engine, air is pressurized in a compressor and mixed with fuel in a combustor for generating hot combustion gases which flow downstream through turbine stages. A typical gas turbine engine generally possesses a forward end and an aft end with its several core or propulsion components positioned axially therebetween. An air inlet or intake is located at a forward end of the engine. Moving toward the aft end, in order, the intake is followed by a compressor, a combustion chamber, and a turbine. It will be readily apparent by those skilled in the art that additional components may also be included in the engine, such as, for example, low-pressure and high-pressure compressors, and low-pressure and high-pressure turbines. This, however, is not an exhaustive list. In a typical turbo-prop gas turbine engine aircraft, turbine stages extract energy from the combustion gases to turn a turbo-propeller. In some embodiments, the propulsor may power one or more turbo-propellers (hereinafter, "turbo-prop") in the case of some airplanes. In alternate embodiments, the propulsor may drive one or more turbo-propellers, embodied as rotors, for operation of a helicopter.

During operation, significant heat is generated by the combustion and energy extraction processes with gas turbine engines. It is necessary to manage heat generation within the engine so as to not raise engine temperatures to unacceptable levels, which may cause engine failure. One method of controlling heat and improving engine life is to lubricate engine components with cooling fluids and further cool the lubricating fluids. In such heat exchanger embodiments, the air stream is utilized to cool the hot fluid of the turbine engine.

Prior art mounting systems for surface coolers utilize heavier, complicated mounting systems which are more complex to manufacture. These mounting systems utilize multiple welds which sometimes may warp the metal of the surface cooler. It would be desirable to overcome these complicated mounting systems and provide an easily manufactured, easily installed and highly operable system which still allows for the thermal growth, for example, in the circumferential direction, of the cooler. Additionally, it would be desirable to provide a system which overcomes the potential for high cycle fatigue which is possible with surface cooler structures.

SUMMARY

According to present embodiments, a surface heat exchanger is provided which utilizes forward and aft brackets to retain the heat exchanger in position. The surface heat exchanger includes a plurality of core cooling channels as well as fins which are disposed for air flow through the gas turbine engine. The brackets include a low-friction wear material as well as an isolator sheet which provides some spring force on the heat exchanger.

According to some embodiments, a surface cooler support mechanism comprises a heat exchanger including a body having a plurality of cooling channels, a plurality of heat exchange fins disposed adjacent the plurality of cooling channels, the body having opposed forward and aft cooler ribs extending along lateral edges of the body. At least one aft bracket has an aft bracket body and a first groove for receiving the aft cooler rib and at least one forward bracket has a forward bracket body and a second groove for receiving the forward cooler rib. A low friction wear material is disposed within each of the first groove and the second groove. An isolator sheet is disposed in at least one of the first groove and the second groove.

Optionally, the isolator sheet providing a spring force and may be compressible. The isolator sheet provides damping for high cycle fatigue. The first groove and the second groove each have a support surface wherein the support surface may be substantially horizontal. The support surface may be at an angle to an engine axis. The low-friction wear material may have a low coefficient of friction. For example, the low-friction wear material may be a PEEK material. The low-friction wear material allows circumferential movement of said forward and aft cooler ribs therethrough. The forward bracket and the aft bracket being curved circumferentially. The forward bracket and the aft bracket may be offset in an axial direction or may be aligned in an axial direction. The forward bracket and the aft bracket may be substantially c-shaped. The body may further comprise a plurality of de-congealing channels.

All of the above outlined features are to be understood as exemplary only and many more features and objectives of the surface cooler support mechanism may be gleaned from the disclosure herein. Therefore, no limiting interpretation of this summary is to be understood without further reading of the entire specification, claims, and drawings included herewith.

BRIEF DESCRIPTION OF THE ILLUSTRATIONS

The above-mentioned and other features and advantages of these exemplary embodiments, and the manner of attaining them, will become more apparent and the surface cooler support mechanism will be better understood by reference to the following description of embodiments taken in conjunction with the accompanying drawings, wherein.

DETAILED DESCRIPTION

Figure 1:
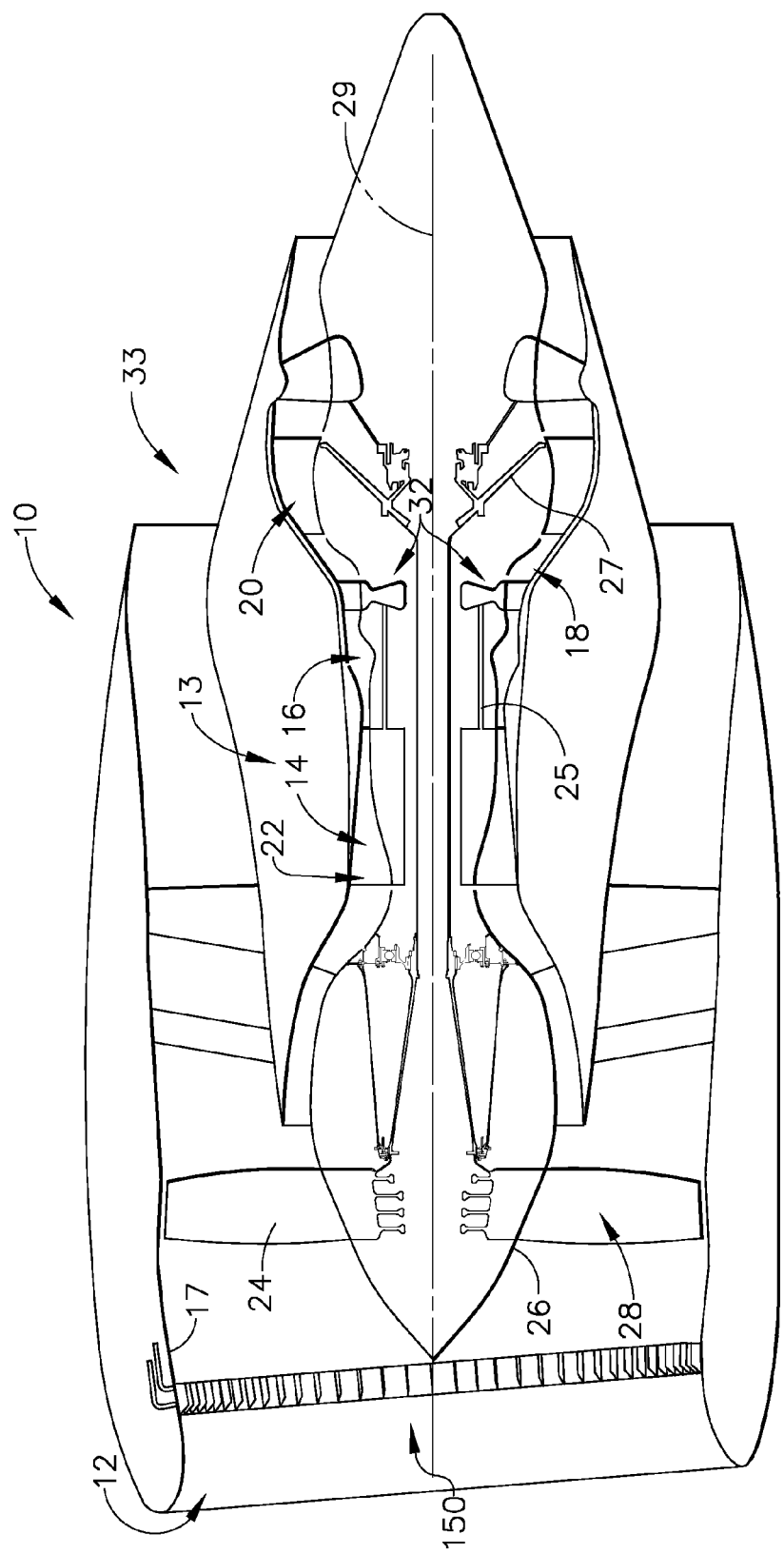
FIG. 1 is a schematic illustration of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present description covers such modifications and variations as come within the scope of the appended claims and their equivalents.

Referring to FIGS. 1-7, various embodiments of aircraft heat exchangers are depicted. The heat exchanger may be utilized on flow path surfaces within the inlet area of a turbine engine or the by-pass flow area. Alternatively, heat exchangers may be used on the external surfaces of an aircraft, such as an airplane or helicopter wherein the rotor wash from the propeller or rotor blades moves air over the heat exchanger to cool engine cooling fluid, such as for non-limiting example, bearing oil. The heat exchanger includes a forward and an aft bracket which retain the heat exchanger in position. The brackets provide stability in the axial direction while allowing for thermal expansion in the circumferential direction. The brackets include a wear material as well as an isolating or spring-like material.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine outlet, or a component being relatively closer to the engine outlet as compared to an inlet.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

Referring initially to FIG. 1, a schematic side section view of a gas turbine engine 10 is shown having an engine inlet end 12 wherein air enters the propulsor or core 13 which is defined generally by a multi-stage high pressure compressor 14, a combustor 16 and a multi-stage high pressure turbine 18. Collectively, the propulsor 13 provides power for operation of the engine 10.

The gas turbine engine 10 further comprises a fan assembly 28, a low pressure turbine 20, and a low pressure compressor or booster 22. The fan assembly 28 includes an array of fan blades 24 extending radially outward from a rotor disc shown generally at 26. Opposite the intake side 12 in the axial direction is an exhaust side 33. In one embodiment, engine 10 is, for non-limiting example, a CT7 engine commercially available from General Electric Aircraft Engines, Cincinnati, Ohio. Although the gas turbine 10 is shown in an aviation embodiment, such example should not be considered limiting as the gas turbine 10 may be used for aviation, power generation, industrial, marine or the like.

In operation air enters through the air inlet end 12 of the engine 10 and moves through at least one stage of compression in the compressors 22, 14 where the air pressure is increased and directed to the combustor 16. The compressed air is mixed with fuel and burned providing the hot combustion gas which exits the combustor 16 toward the high pressure turbine 18. At the high pressure turbine 18, energy is extracted from the hot combustion gas causing rotation of turbine blades 32 which in turn cause rotation of the high pressure shaft 25. The high pressure shaft 25 passes toward the front of the engine to cause rotation of the one or more compressor 14 stages and continue the power cycle. A low pressure turbine 20 may also be utilized to extract further energy and power additional compressor stages. The turbofan 28 is connected by the low pressure shaft 27 to a low pressure compressor 22 and the low pressure turbine 20. The turbofan 28 creates thrust for the turbine engine 10. The low pressure and or by-pass air may be used to aid in cooling components of the engine as well.

The gas turbine 10 is axis-symmetrical about engine axis 29 so that various engine components rotate thereabout. An axis-symmetrical high pressure shaft 25 extends through the turbine engine forward end into an aft end and is journaled by bearings along the length of the shaft structure. The shaft 25 rotates about the axis or centerline 29 of the engine 10. The high pressure shaft 25 may be hollow to allow rotation of a low pressure turbine shaft 27 therein and independent of the high pressure shaft 25 rotation. The low pressure shaft 27 also may rotate about the centerline axis 29 of the engine. During operation the shaft rotates along with other structures connected to the shaft such as the rotor assemblies of the turbine in order to create power or thrust for various types of turbines used in power and industrial or aviation areas of use.

Figure 2:
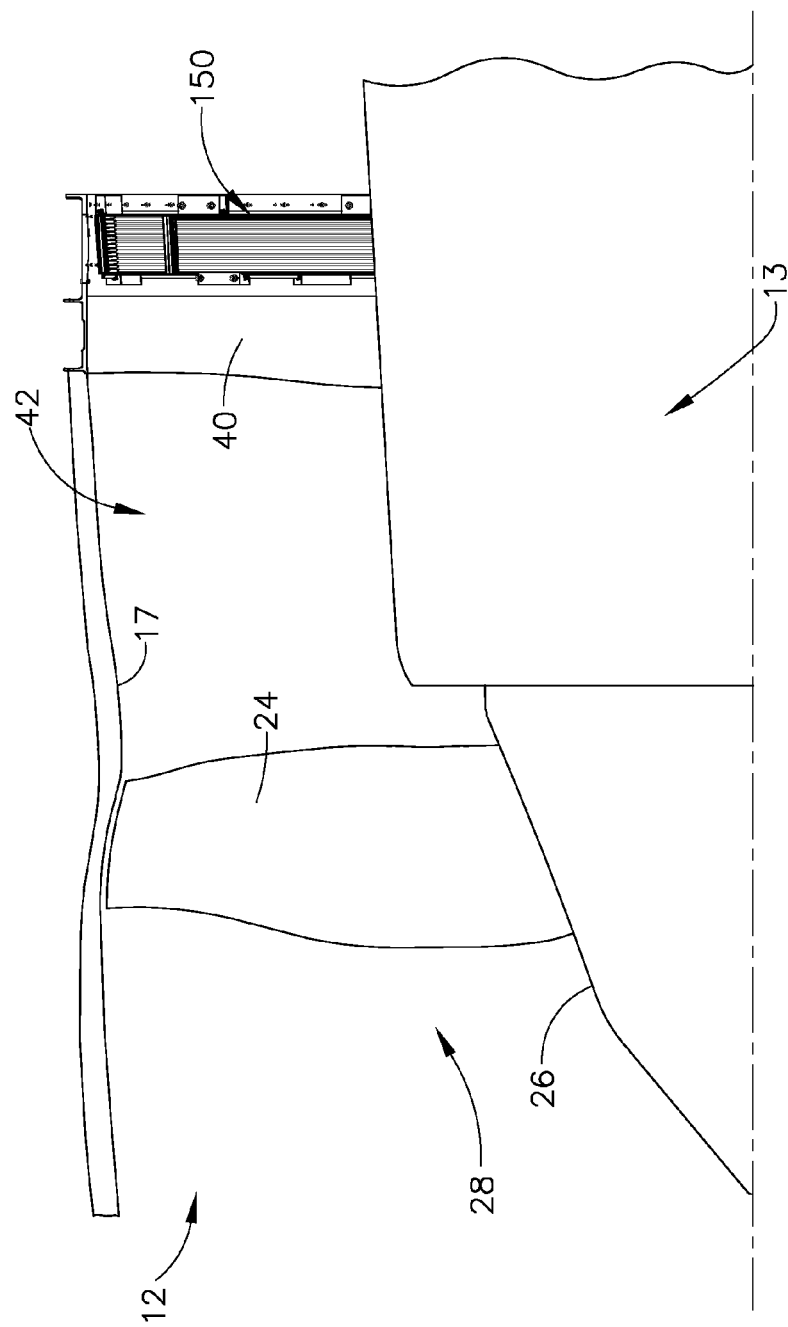
FIG. 2 is an exemplary side view of the intake portion of the gas turbine engine.

Referring now to FIG. 2, a side view of an inlet end 12 of the engine 10 is depicted. The inlet 12 includes the fan assembly 28 defined in part by the rotor disc 26 and plurality of blades 24 extending from the disc 26. Downstream of the fan assembly 28 is a set of outlet guide vanes which extend between the fan case 17 and the core 13. The outlet guide vanes 40 control the direction of air flow exiting the fan assembly 28 and moving through the by-pass duct 42. Aft of the outlet guide vane 40 is at least one surface cooler 150. According to one embodiment, two surface coolers may be utilized to extend substantially about the circumference of the fan case 17. Additionally, one or more segments may be utilized to define the circumferential shape of the surface cooler 150. Additionally, the surface cooler 150 is depicted aft of the outlet guide vane 40. However, according to other embodiments, the surface cooler 150 may be positioned forward of the fan assembly 28, as depicted in FIG. 1. Further, the surface cooler 150 may be exposed further aft into the by-pass duct 42.

Figure 3:
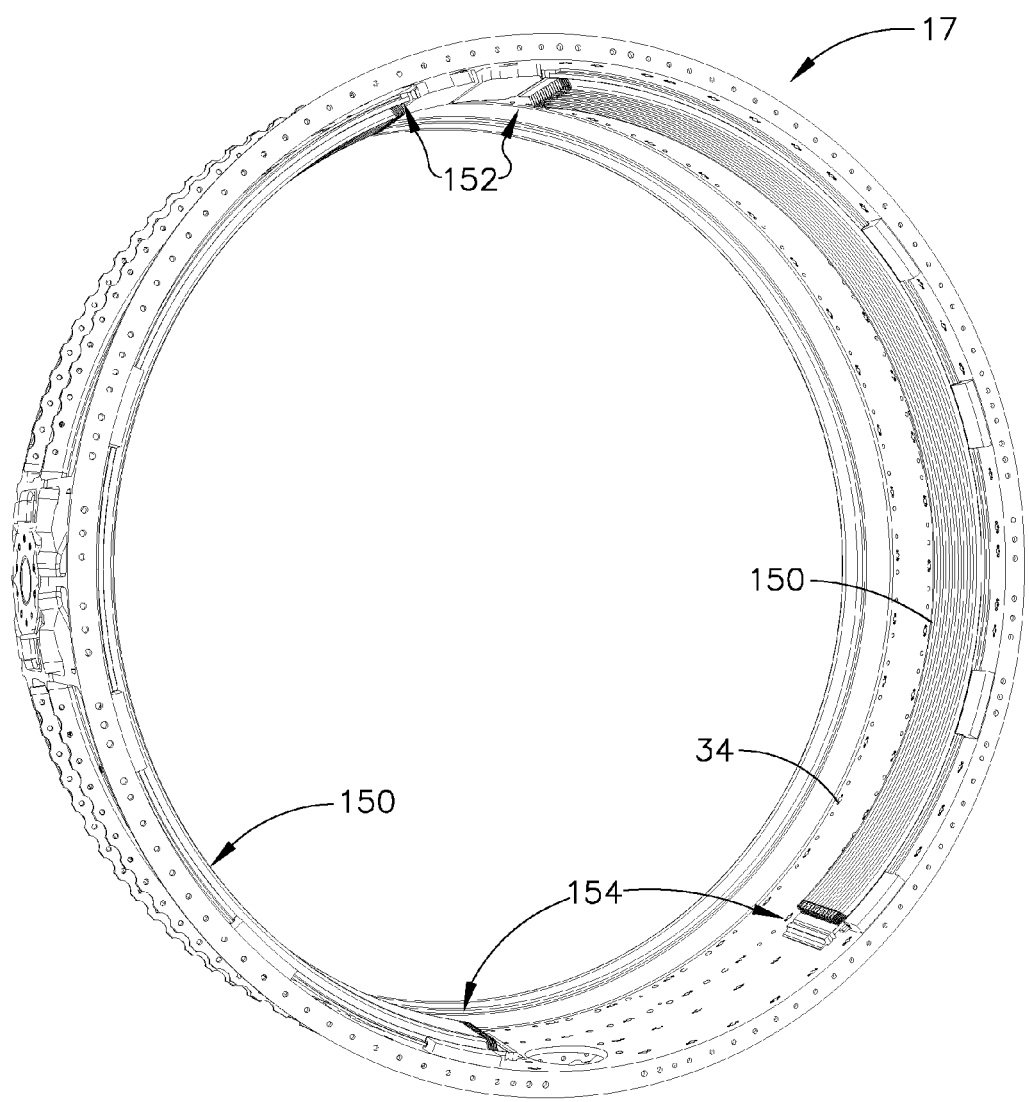
FIG. 3 is an isometric view of a fan case having at least one surface cooler circumferentially disposed therein.

Referring now to FIG. 3, an isometric view of a fan case 17 is depicted removed from the engine 10. The fan case 17 is circular in shape having an internal surface 34. Along the internal surface 34 are first and second surface coolers 150. The surface coolers 150 extend circumferentially along the internal surface and define a substantially circular assembly. As previously described, the surface cooler 150 may include one segment which extends about some or all of the circumference or may be comprised of two or more segments joined together to define the circumferential shape. In the instant embodiment, each of the two coolers 150 includes an inlet manifold 152 positioned at one side of the case and a heat exchanger body extending semi-circularly about the fan case 17. At the opposite end of the cooler are return manifolds 154. These structures 152, 154 may be moved and are not limited to the depicted end location.

Figure 4:
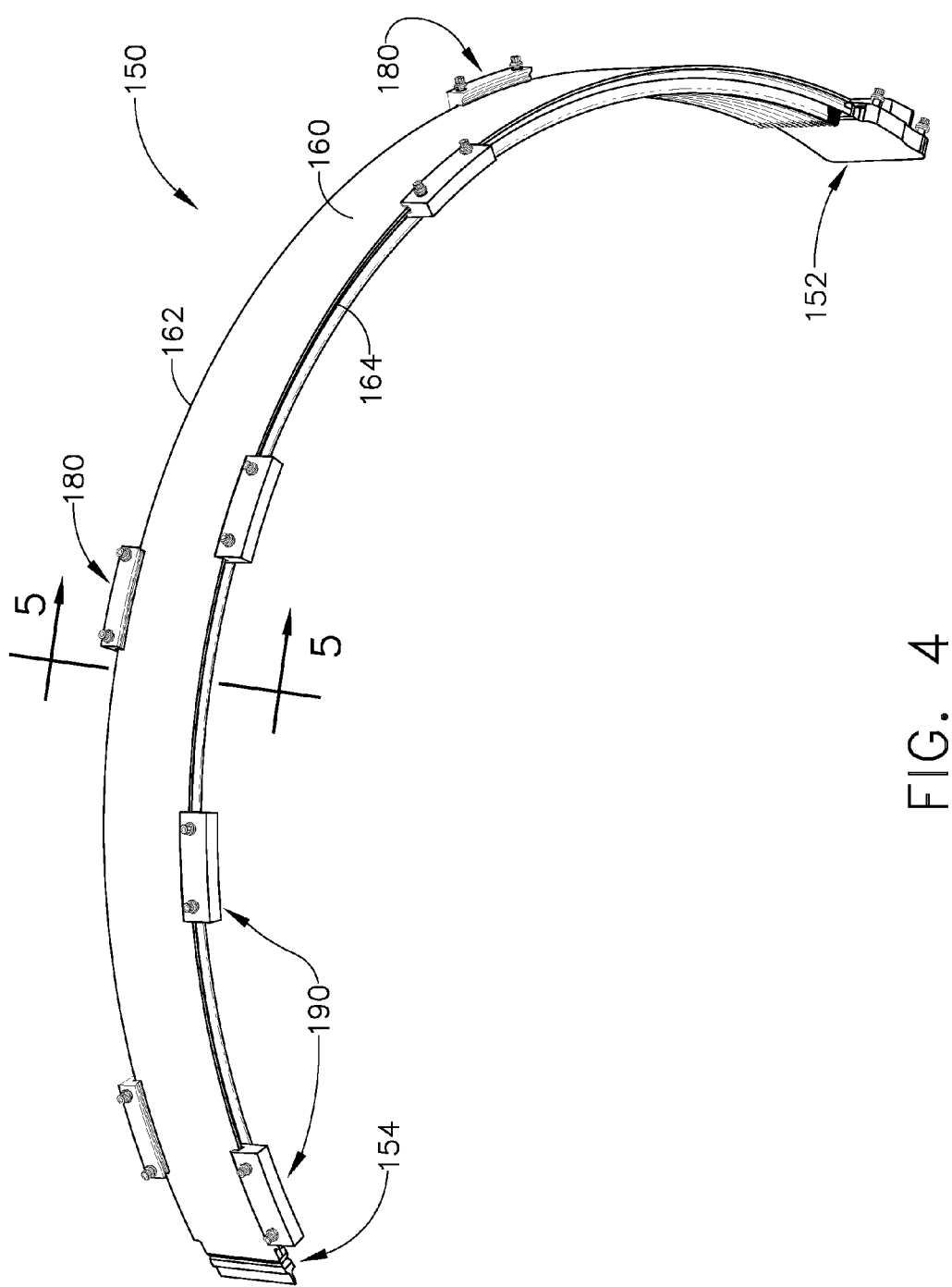
FIG. 4 is an upper isometric view of the surface cooler including a plurality of support mechanisms.

Referring now to FIG. 4, an isometric view of a surface cooler 150 is depicted. The cooler 150 includes the inlet manifold 152 at a first end and the return manifold 154 at a second end. A body 160 extends between the inlet manifold 152 and the return manifold 154. The body 160 and manifolds 152, 154 may be formed integrally or may be connectable with each other. The body 160 includes a first rib 162 on a forward side of the body 160 and an aft rib 164 on the aft side of the body. The ribs 162, 164 may be continuous or may be discontinuous in the circumferential direction and provide a location for the forward and aft brackets to connect with body 160. Brackets 180, 190 which are connected to the ribs 162, 164, may be continuous or discontinuous as shown to reduce weight. The brackets 180, 190 may be aligned with one another in the axial direction or may be offset from one another in the axial direction.

Figure 5:
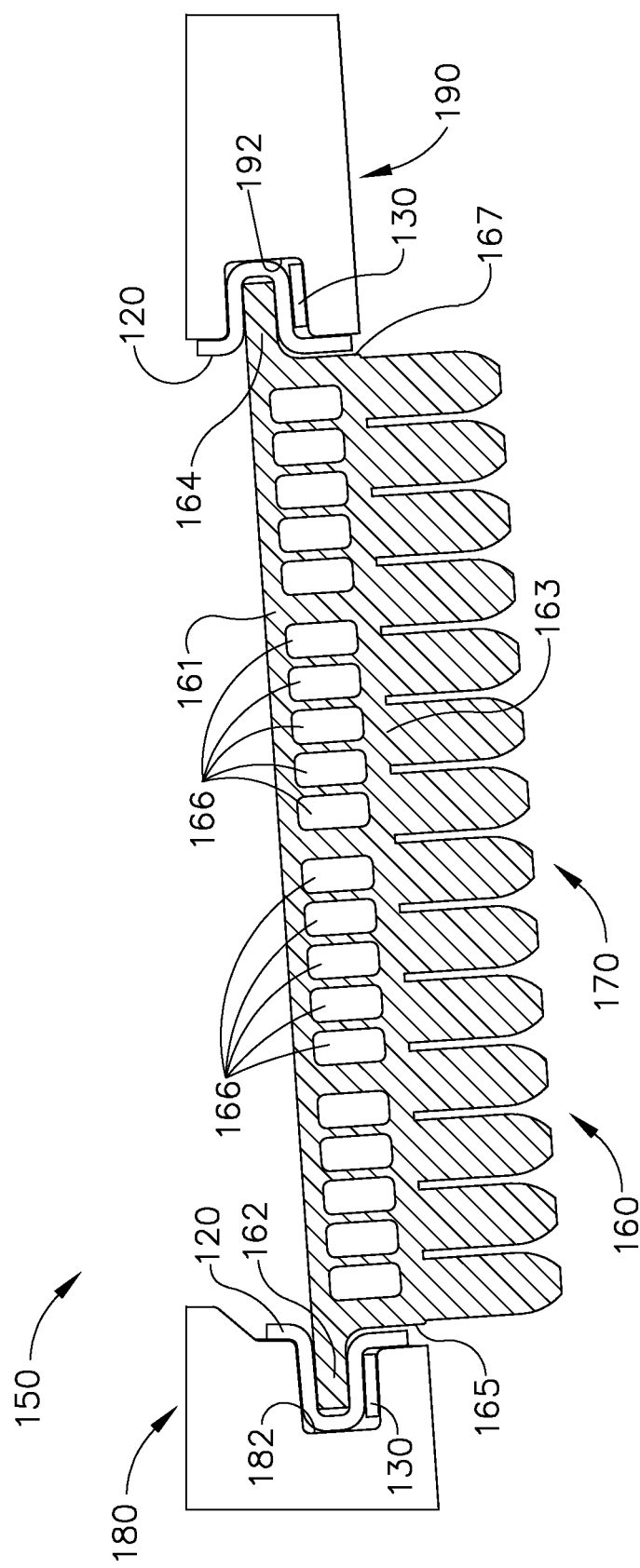
FIG. 5 is a cross-section view of a support mechanism including a forward and aft bracket which are mounting a surface heat exchanger.

Referring now to FIG. 5, a cross section view of surface cooler 150 is depicted. The cooler body 160 is generally rectangular in shape having an upper surface 161 and a lower surface 163 extending between forward and aft surfaces 165, 167. The first rib 162 and the second rib 164 extend from the forward and aft surfaces 165, 167 in the forward and aft directions respectively.

The interior of the cooler body 160 may include a plurality of cooling channels 166. These channels 166 allow flow of engine cooling fluid which enters from the manifold 152 to pass into the cooler body 160 and moves toward the return manifold 154. Along the lower surface 163 is a plurality of fins 170. During passage through the cooling channels 166, air passing through the fins 170 connected to the cooler body 160 to provide heat exchange and reduce the temperature of the engine fluid before the fluid is directed to a storage reservoir or back into service in, for example, a bearing sump.

As shown in the section view, the ribs 162, 164 extend into grooves 182, 192. This captures the cooler body 160 in radial outward and inward directions. The arrangement also captures the body 160 in the forward and aft axial directions.

Each of the forward and aft brackets 180, 190 have a body which is curved circumferentially to approximate the curvature of the fan case 17. Each of the bracket bodies includes a groove 182, 192 which receives the corresponding forward rib 162 and aft rib 164 of the cooler body 160. Within each groove 182, 192 is a low-friction wear material 120. Such material is generally u-shaped and surrounds the upper, lower and lateral surfaces of the forward rib 162 and aft rib 164. Beneath the low-friction material 120 also positioned within the grooves 182, 192, is an isolator sheet 130. The isolator sheet 130 provides a spring force on the cooler body 160 forcing the ribs 162, 164 radially outward within the grooves 182, 192.

Figure 6:
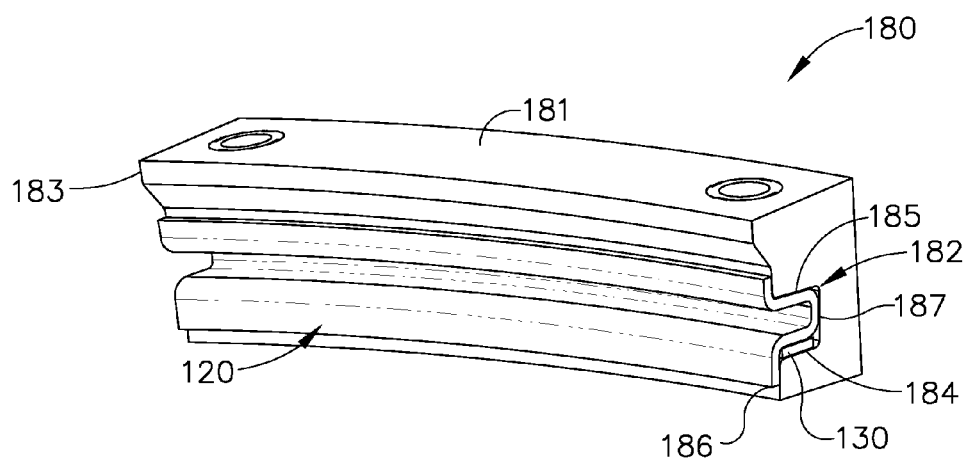
FIG. 6 is an isometric view of a forward bracket.

Referring now to FIG. 6, an isometric view of the forward bracket 180 is depicted. The bracket 180 includes an upper surface 181 having fastening apertures for connection to the fan case 17 (FIG. 1). The upper surface extends downwardly at one or more transition surfaces 183 to the groove 182. The one or more transition surfaces may extend downwardly vertically or at an angle or a combination thereof. The groove includes a seat 184 which is substantially horizontal or parallel to the engine axis 29 (FIG. 1). Alternatively, the seat 184 may be disposed at an angle to the engine axis 29 (FIG. 1). The groove 182 further comprises an upper surface 185 and a groove depth surface 187 which extends between the upper surface 185 and the seat 184. The groove 182 may have various forms. According to the instant embodiment, the structure is generally u-shaped or c-shaped. However, the seat and upper surface 184, 185 may be parallel to the engine axis or may be at some angle to the engine axis. These surfaces may vary independently so that one is parallel to the engine axis 29 while the other may or may not be. The depth surface 187 provides a distance into the groove 182 in which the low-friction material 120 may extend. The low-friction material 120 may conform to the groove 182 shape. The low-friction material 120 is a thin sheet of material which is able to extend into the groove 182 as shown. The material 120 is of a length so as to overlap at least a portion of the transition surface 183 and a portion of a lower inner face 186 of the bracket. This allows the cooler body 160 to grow in the circumferential direction of the engine 10 as the structure 150 does during thermal expansion while in use. Additionally, as the engine cools, the body 160 may contract also in the circumferential direction through the groove 182. The low-friction wear material 120 inhibits metal-to-metal contact and also provides a wear material which may be more easily replaced during engine rebuilds at given maintenance intervals. The low-friction wear material 120 may be a PEEK material, for example A17B93A1 or equivalent, according to some embodiments. This material provides a low-friction surface between the grooves 182, 192 and the cooler ribs 162, 164. Additionally, the material 120 may wear and be more easily replaced during scheduled maintenance intervals.

Disposed within the groove 182 on the seat surface 184 is an isolator sheet 130. The isolator sheet 130 may be formed of, for example, AMS-3301 or equivalent, and provides a spring biasing of the ribs 162, 164 (FIG. 5) and low-friction material 120 in a radial direction. While the isolator sheet 130 is shown positioned on the seat 184, it may be that the isolator sheet 130 is positioned on the upper surface 185 of the groove.

Figure 7:
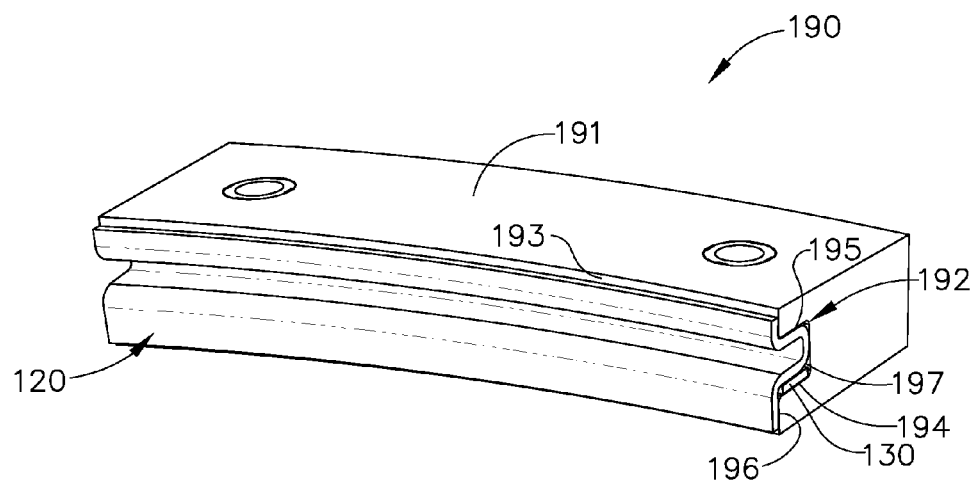
FIG. 7 is an isometric view of an aft bracket.

Referring now to FIG. 7, the aft bracket 190 is depicted in isometric view. The aft bracket 190 includes an upper surface 191 and a transition surface 193 which, according to the exemplary embodiment, is generally vertical and depends from upper surface 191. However, such structure need not be purely vertical and may be angled as depicted with the forward bracket 180 or may include both angled and vertical surfaces as depicted in the bracket 180. A groove 192 extends into the bracket 190 from the transition surface 193. The groove 192 includes an upper surface 195 and a seat 194. The groove depth is defined by surface 197 which is generally vertical in the depicted embodiment. The seat 194 is generally horizontal but alternatively, may be at an angle to the engine axis 29. As with the previous embodiment, the seat 194 includes a spring-biasing isolator sheet 130 and a low-friction wear material 120 extending into the groove 192. The low-friction wear material 120 is of a length so as to project from the groove and cover at least portions of a lower surface 196 and the upper transition surface 193. This allows for movement in the circumferential direction of the body 160 without binding of the bracket 190 and body 160 during thermal expansion or contraction. The low friction material 120 may again be made of PEEK, however other materials may be used. Similarly, the isolator sheet 130 may be formed of AMS-3301 or equivalent.

The foregoing description of structures and methods has been presented for purposes of illustration. It is not intended to be exhaustive or to limit the invention to the precise steps and/or forms disclosed, and obviously many modifications and variations are possible in light of the above teaching. Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

What is claimed is:

1. A surface cooler support mechanism comprising:
    a heat exchanger including:
        a body having a plurality of cooling channels;
        a plurality of heat exchange fins disposed adjacent to the plurality of cooling channels;
        said body having opposed forward and aft cooler ribs extending along lateral edges of said body;
        at least one aft bracket having an aft bracket body and a first groove for receiving the aft cooler rib;
        at least one forward bracket having a forward bracket body and a second groove for receiving the forward cooler rib;
        a material disposed within each of said first groove and said second groove, wherein the coefficient of friction of the material enables the forward and aft cooler ribs aft to slide across one or more surfaces of the first groove or second groove, wherein the material lines the surfaces of the first groove and second groove, and separates the body from the first bracket and second bracket; and
        an isolator sheet disposed in at least one of said first groove and said second groove, wherein the isolator sheet is disposed between the material and a surface of the at least one of the first and second grooves.

2. The surface cooler support mechanism of claim 1, wherein the isolator sheet provides a spring force.

3. The surface cooler support mechanism of claim 2, wherein the isolator sheet is compressible.

4. The surface cooler support mechanism of claim 3, wherein the isolator sheet provides damping to militate against cycle fatigue.

5. The surface cooler support mechanism of claim 1, wherein the first groove and the said second groove each have a support surface.

6. The surface cooler support mechanism of claim 5, wherein at least one of the support surfaces is substantially parallel to a centerline axis of an engine.

7. The surface cooler support mechanism of claim 5, wherein at least one of the support surfaces is at an angle to a centerline axis of an engine.

8. The surface cooler support mechanism of claim 1, wherein the coefficient of friction is the same as the coefficient of friction of a PEEK material.

9. The surface cooler support mechanism of claim 1, wherein the material includes a PEEK material.

10. The surface cooler support mechanism of claim 8, wherein the material allows circumferential movement of the forward cooler ribs through the second groove and the aft cooler ribs through the first groove.

11. The surface cooler support mechanism of claim 1, wherein the forward bracket and the aft bracket are curved circumferentially.

12. The surface cooler support mechanism of claim 1, wherein the forward bracket and the aft bracket are offset in an axial direction.

13. The surface cooler support mechanism of claim 1, wherein the forward bracket and the aft bracket are aligned in an axial direction.

14. The surface cooler support mechanism of claim 1, wherein the forward bracket and the aft bracket are substantially c-shaped.

15. A surface cooler support system, comprising:
    a heat exchanger including:
        a body having a set of cooling channels;
        a set of heat exchange fins adjacent to the set of cooling channels;
        a forward and an aft cooler rib extending along opposing lateral edges of the body;
        a plurality of circumferentially spaced aft brackets that include an aft bracket body and a first groove adapted to receive the aft cooler rib;
        a plurality of circumferentially spaced forward brackets that includes a forward bracket body and a second groove adapted to receive the forward cooler rib;
        a friction wear material, disposed in each of the first groove and the second groove, that enables the forward and aft cooler rib to slide relative to one or more surfaces of the first groove or second groove; and
        an isolator sheet that is disposed in at least one of the first groove and the second groove.

16. The surface cooler support system of claim 15, wherein the friction wear material allows circumferential movement of the aft cooler rib through the first groove and the forward cooler rib through the second groove.

17. The surface cooler support system of claim 15, wherein the first groove and the said second groove include respective support surfaces, and at least one of the support surfaces is at least one of: substantially parallel to a centerline axis of an engine, or at an angle to a centerline axis of the engine.

18. The surface cooler support system of claim 15, wherein the isolator sheet biases at least one of the forward and the aft cooler ribs.

19. The surface cooler support system of claim 15, wherein the friction wear material has a friction coefficient that is the same as a friction coefficient of a PEEK material.

20. The surface cooler support system of claim 15, wherein the friction wear material includes a PEEK material.

* * * * *